United States Patent
Klement

(10) Patent No.: US 11,492,236 B2
(45) Date of Patent: Nov. 8, 2022

(54) METHOD FOR AUTOMATICALLY POSITIONING A STRADDLE CARRIER FOR CONTAINERS, AND STRADDLE CARRIER FOR THIS PURPOSE

(71) Applicant: Konecranes Global Corporation, Hyvinkää (FI)

(72) Inventor: Stefan Klement, Rimpar (DE)

(73) Assignee: Konecranes Global Corporation, Hyvinkää (FI)

( * ) Notice: Subject to any disclaimer, the term of this patent is extended or adjusted under 35 U.S.C. 154(b) by 697 days.

(21) Appl. No.: 16/338,242

(22) PCT Filed: Oct. 16, 2017

(86) PCT No.: PCT/EP2017/076332
§ 371 (c)(1),
(2) Date: Mar. 29, 2019

(87) PCT Pub. No.: WO2018/073168
PCT Pub. Date: Apr. 26, 2018

(65) Prior Publication Data
US 2020/0031634 A1    Jan. 30, 2020

(30) Foreign Application Priority Data
Oct. 18, 2016    (DE) .......................... 102016119839.0

(51) Int. Cl.
*B66C 13/48*    (2006.01)
*G05D 1/02*    (2020.01)
(Continued)

(52) U.S. Cl.
CPC .............. *B66C 13/48* (2013.01); *B66C 13/40* (2013.01); *B66C 19/007* (2013.01); *G05D 1/021* (2013.01); *G05D 2201/0216* (2013.01)

(58) Field of Classification Search
CPC ....... B66C 13/23; B66C 13/32; B66C 19/002; B66C 19/005; B66C 19/007
See application file for complete search history.

(56) References Cited

U.S. PATENT DOCUMENTS 3,891,100 A * 6/1975 Tamaki .................. B66C 13/46
                                                              414/342
4,139,107 A * 2/1979 Ninomiya ............... B66C 1/663
                                                              212/319
(Continued)

FOREIGN PATENT DOCUMENTS

CN    101269751 A    9/2008
CN    201125130 Y    11/2008
(Continued)

OTHER PUBLICATIONS

Preliminary Report on Patentability of the International Searching Authority in English from corresponding Patent Cooperation Treaty (PCT) Application No. PCT/EP2017/076332, completed Oct. 4, 2018.
(Continued)

*Primary Examiner* — Russell Frejd
*Assistant Examiner* — Sara J Lewandroski
(74) *Attorney, Agent, or Firm* — Gardner, Linn, Burkhart & Ondersma LLP

(57) ABSTRACT

A method for positioning a straddle carrier for containers and a container to be placed behind a container that has already been placed. The straddle carrier is moved by means of travel supports, travel drives, and a controller that interacts with same, and measurement signals from sensors arranged on the straddle carrier are processed by the controller in order to move and position the straddle carrier and the container to be placed.

10 Claims, 7 Drawing Sheets

(51) Int. Cl.
*B66C 19/00* (2006.01)
*B66C 13/40* (2006.01)

(56) References Cited

U.S. PATENT DOCUMENTS

| | | | | |
|---|---|---|---|---|
| 4,850,786 | A * | 7/1989 | Oswald | B66C 19/007 294/81.2 |
| 4,919,283 | A * | 4/1990 | Riley | B66C 19/002 212/324 |
| 5,729,453 | A * | 3/1998 | Lee | B66C 13/063 701/50 |
| 5,780,826 | A * | 7/1998 | Hareyama | B65G 63/004 235/375 |
| 6,161,887 | A * | 12/2000 | Shiota | B66C 1/663 294/81.5 |
| 6,190,107 | B1 * | 2/2001 | Lanigan, Sr | B66C 19/002 414/561 |
| 6,256,553 | B1 * | 7/2001 | Erikkila | B66C 13/063 212/284 |
| 7,261,351 | B1 * | 8/2007 | Lee | B66C 13/46 294/81.1 |
| 2002/0191813 | A1 * | 12/2002 | Uchida | B66C 13/085 382/104 |
| 2003/0015489 | A1 * | 1/2003 | Uchida | B66C 13/46 212/326 |
| 2005/0016005 | A1 * | 1/2005 | Voecks | G01C 9/16 33/344 |
| 2008/0219827 | A1 * | 9/2008 | Lanigan | B65G 63/004 414/792.8 |
| 2009/0129904 | A1 * | 5/2009 | Bauer | B66C 19/007 414/389 |
| 2009/0180683 | A1 * | 7/2009 | Lee | G06V 30/274 714/E11.002 |
| 2009/0245990 | A1 * | 10/2009 | Lanigan, Sr | B66F 3/46 414/495 |
| 2011/0199099 | A1 | 8/2011 | Kato et al. | |
| 2014/0002273 | A1 | 1/2014 | King et al. | |
| 2014/0046587 | A1 * | 2/2014 | Rintanen | B66F 9/063 701/469 |
| 2014/0285330 | A1 * | 9/2014 | Kouhia | B66C 19/002 340/425.5 |
| 2015/0307330 | A1 * | 10/2015 | Suzuki | B66C 13/48 701/50 |
| 2016/0009531 | A1 * | 1/2016 | Saliba | B66C 19/007 701/19 |
| 2016/0332847 | A1 * | 11/2016 | Hegewald | B66C 19/007 |
| 2017/0357026 | A1 * | 12/2017 | Gallagher | B65G 67/603 |

FOREIGN PATENT DOCUMENTS

| | | | | |
|---|---|---|---|---|
| CN | 102186761 | A | | 9/2011 |
| CN | 103660975 | A | | 3/2014 |
| CN | 104085794 | A | | 10/2014 |
| CN | 104379489 | A * | 2/2015 | B66C 13/46 |
| CN | 104812692 | A | | 7/2015 |
| CN | 105980287 | A | | 9/2016 |
| DE | 202007016156 | U1 | | 4/2008 |
| DE | 102008011539 | B3 | | 6/2009 |
| EP | 2927178 | A1 | | 10/2015 |
| JP | 2011042439 | A | | 3/2011 |
| WO | 9405586 | A1 | | 3/1994 |
| WO | WO-9405586 | A1 * | 3/1994 | B66C 13/46 |
| WO | 2010006295 | A2 | | 1/2010 |
| WO | 2015121973 | A1 | | 8/2015 |

OTHER PUBLICATIONS

International Search Report of the International Searching Authority from corresponding Patent Cooperation Treaty (PCT) Application No. PCT/EP2017/076332, indicated completed on Jan. 17, 2018.
Written Opinion of the International Searching Authority from corresponding Patent Cooperation Treaty (PCT) Application No. PCT/EP2017/076332, indicated completed on Jan. 17, 2018.
International Preliminary Examination Report from corresponding Patent Cooperation Treaty (PCT) Application No. PCT/EP2017/076332, dated Oct. 4, 2018.

\* cited by examiner

METHOD FOR AUTOMATICALLY POSITIONING A STRADDLE CARRIER FOR CONTAINERS, AND STRADDLE CARRIER FOR THIS PURPOSE

CROSS REFERENCE TO RELATED APPLICATION

The present application claims the priority benefits of International Patent Application No. PCT/EP2017/076332, filed Oct. 16, 2017, and claims benefit of German patent application DE 10 2016 119 839.0, filed on Oct. 18, 2016.

BACKGROUND AND FIELD OF THE INVENTION

The invention relates to a method for the positioning of a gantry lift stacker, designed as a straddle carrier, for containers in order to position a container to be set down at a preselected distance behind an already set-down container in such a way that, in relation to its longitudinal orientation, the container to be set down is flush with the longitudinal direction of the set-down container, wherein the gantry lift stacker is moved by means of travel supports, travel drives and a controller cooperating therewith, and measurement signals from sensors disposed on the gantry lift stacker are processed by the controller for the purpose of moving and positioning the gantry lift stacker and the container to be set down.

The invention also relates to a gantry lift stacker for containers, in particular for carrying out a method for the positioning of a gantry lift stacker, having travel supports, travel drives and a controller cooperating therewith, having a load picking-up means for containers which can be raised and lowered, having at least one sensor for the positioning of the gantry lift stacker and of the container to be set down.

German patent DE 10 2008 011 539 B3 discloses a fully automatic gantry lift stacker with local radio location and laser steering. For the purposes of vehicle location and navigation the gantry lift stacker is fitted with a plurality of different sensor systems, the signals of which are evaluated, monitored and transmitted to a system of electronic controllers. The vehicle location is carried out using local radio location systems which operate with stationary radio transponders located on the operating surface. Laser scanners are mounted on the vehicle for the purpose of automatic steering of the gantry lift stacker upon reaching a container stack.

U.S. Pat. No. 5,780,826 discloses a container handling apparatus which is designed to be self-driving. The container handling apparatus is fitted with means which permit it to detect a position of the container in the container storage area and to read an identification code attached to the container. The container handling apparatus also includes a first means for detecting the two-dimensional horizontal position of the container, a second means for detecting an additional two-dimensional horizontal position of the container and a means for detecting the vertical position of the container.

The utility model DE 20 007 016 156 U1 discloses a gantry lift stacker having automatic steering for transportation and stacking of containers. The gantry lift stacker consists in a conventional manner of a gantry frame which is U-shaped as seen in the travel direction of the gantry lift stacker and has vertical gantry struts. Two travel supports each with a plurality of electrohydraulically steerable wheels are disposed at a lower end of the gantry struts. In order to set down a container on at least one other container or to pick up a container from at least one further container, the gantry lift stacker travels over a container which can stand alone or in a row of containers. At this juncture, the travel supports move left and right along one or a plurality of containers. Automatic steering is used to assist the driver in steering. For this purpose, a laser scanner is disposed at the front on one of the travel supports and therefore laterally offset with respect to the respective container, the measurement signals of this laser scanner being used to determine a distance between the travel support and a side wall of the container. This is effected in that the laser scanner transmits laser beams in horizontal directions in an angular range between the longitudinal axis of the travel support and the side wall of the container of about 55 degrees and these are reflected from an obstacle, e.g. in the form of the side wall, forwards and laterally of the travel support. The distance to the obstacle is then calculated from a difference in transit time between the transmitted and reflected beam. At this juncture, only obstacles in said angular range of 55 degrees are detected, i.e. only in relation to obstacles or side walls upstream of the travel supports. The distances thus measured to the side wall of the upstream container and the associated measurement angles are then transmitted to an electronic controller which calculates therefrom the distance between the travel support and the side wall of the container. These distances are also used, if necessary, for automatic steering purposes, and, on the basis thereof, desired steering angles are calculated for the turning of the wheels and are transmitted to the steering computer which controls the turning of the wheels. The automatic steering of the gantry lift stacker is also orientated according to the position of the upstream side walls of the container.

It is generally known to use so-called twin spreaders for handling containers. By means of a twin spreader, a gantry lift stacker can simultaneously pick up and transport two containers one behind the other. For the purpose of picking up two container one behind the other in a predetermined frame the twin spreader can compensate for imprecise positioning of the two set-down containers.

In terms of the invention, containers are understood to be ISO containers. ISO containers weigh up to about 38 t and are generally understood to be standardised bulk containers with standardised pick-up points or corners for load picking-up means. ISO containers are conventionally 20, 40 or 45 feet long. ISO containers with a length of 53 feet also already exist. In the area of ISO containers, in addition to the closed containers, refrigerated containers—so-called reefers—and a multiplicity of other container types are also known.

SUMMARY OF THE INVENTION

The present invention provides a method for the positioning of a gantry lift stacker and a gantry lift stacker in order to increase the transport throughput of a gantry lift stacker, e.g. for more rapid handling of containers or more rapid loading and unloading of containers ships.

In accordance with the invention, in the case of a method for the positioning of a gantry lift stacker, designed as a straddle carrier, for containers in order to position a container to be set down behind an already set-down container in such a way that, in relation to its longitudinal orientation, the container to be set down is flush with the longitudinal direction of the set-down container, wherein the gantry lift stacker is moved by means of travel supports, travel drives and a controller cooperating therewith, and measurement signals from sensors disposed on the gantry lift stacker are processed by the controller for the purpose of moving and positioning the gantry lift stacker and the container to be set down, positioning one behind the other, which permits simultaneous picking up of two containers, is achieved in that by means of at least one sensor a position of a rear wall of an already set-down container is determined and then the container to be set down is set down from the gantry lift stacker at a preselected distance behind the set-down container in such a way that, in relation to its longitudinal orientation, the container to be set down is flush with the longitudinal direction of the set-down container.

By the determination of the position of a rear wall of an already set-down container, it is ensured that the container to be set down can be positioned with a high level of precision behind the set-down container. This positioning can be carried out both by manual and also automatic or semi-automatic operation. One advantage of the invention is thus that a row of containers with slight irregularity can thereby be formed, and storage space can be saved by uniform and narrow spacing of the containers.

Within the scope of the invention, determination of the position of the rear wall of an already set-down container is understood to be a measurement which serves to detect the upper edge or side edges of the already set-down container. In particular, the position of the rear wall is understood to be a measurement of the distance to the container upper edge.

Furthermore, provision is made in accordance with the invention that, in automatic operation, the container to be set down is set down automatically by means of an automatically acting controller.

Automatic operation, in which the controller positions the gantry lift stacker and the container to be set down without active intervention of a driver is advantageous for relieving pressure on the driver, in particular during complex maneuvering which requires high levels of concentration.

A further advantage of the invention is that the automatically acting controller is activated and deactivated by a driver.

In this way, even in an automatic operation, the driver retains control since he can manually activate and deactivate the automatic operation.

A further advantageous embodiment involves the container to be set down being set down in manual operation in which the gantry lift stacker is operated manually by a driver with the assistance of the measurement values supplied by the sensors.

Such an operation assists the driver in controlling the gantry lift stacker and therefore relieves him of pressure but at the same time he continues to have manual control over the gantry lift stacker. Therefore, in this operation a high level of flexibility is offered.

A further advantage of the invention is that by means of a load picking-up means which can be raised and lowered the gantry lift stacker picks up and sets down a container to be set down. This permits precise positioning of the container to be set down with respect to an already set-down container and therefore permits the use of a so-called spreader in twin operation. In order to pick up two containers simultaneously, both containers must be precisely positioned and aligned with respect to each other. A defined distance between the two containers is decisive for the pick-up using a spreader in twin operation. The distance between two containers is 10 to 100 mm, in particular 30 mm.

In accordance with the invention, in the case of a gantry lift stacker, designed as a straddle carrier, for containers, in particular for carrying out a method for the positioning of a gantry lift stacker, having travel supports, travel drives and a controller cooperating therewith, having a load picking-up means for containers which can be raised and lowered, having at least one sensor for positioning the gantry lift stacker and the container to be set down, positioning one behind the other, which permits simultaneous pick-up of two containers is achieved in that at least one sensor is disposed on the gantry lift stacker, by means of which a position of a rear wall of the already set-down container can be determined and the container to be set down can be set down from the gantry lift stacker at a preselected distance behind the set-down container in such a way that, in relation to its longitudinal orientation, the container to be set down is flush with the longitudinal direction of the set-down container.

Such an arrangement of at least one sensor on the gantry lift stacker permits detection of the rear wall of the set-down container. Only then can the gantry lift stacker be positioned at a preselected distance. For example, a position of the sensor on the spreader or the running gear units is possible. It is further preferred that at least two spreader sensors are disposed on the front and rear face of the spreader relative to the forwards travel direction of the gantry lift stacker and at least four outer sensors are disposed on four travel supports of the gantry lift stacker in order to determine the distance and an orientation in the longitudinal direction of the set-down container.

Therefore, by means of the two spreader sensors the position of the rear wall of an already set-down container can be determined in front of or behind the gantry lift stacker relative to the forwards travel direction. The outer sensors on the travel supports additionally permit the orientation of the container to be set down relative to its longitudinal axis to be determined. The container can thus be orientated according to the measurement values supplied by the sensors.

Provision is advantageously made that the spreader sensors for determining the position of the rear wall of an already set-down container are orientated to the ground at a 90° angle, i.e. vertically downwards as seen from the spreader in the travel direction. By means of the vertically downwardly orientated spreader sensors, it is possible to distinguish between the ground and a set-down container and therefore to detect an upper edge of the already set-down container.

A further embodiment in accordance with the invention makes provision that at least four outer sensors are disposed orientated forwards on the front travel supports and orientated rearwards on the rear travel supports relative to the forwards travel direction, and at least four inner sensors are disposed inwardly on travel supports of the gantry lift stacker in order to determine the distance and orientation in the longitudinal direction of the container to be set down.

By means of the outer sensors, which are disposed on the outer ends of the travel supports, the position of the already set-down container or its rear wall is determined. Four inner sensors are used to determine the orientation of the container to be picked up. This sensor arrangement is particularly advantageous for upgrading a gantry lift stacker with already available outer sensors for automatic steering to a gantry lift stacker with automatic steering and automatic orientation of a picked-up container. By supplementation with four inner sensors a precise determination of the position of the container to be picked up is possible and so this container can be orientated relative to the already set-down container.

A further preferred variation of the gantry lift stacker includes at least four outer sensors being disposed at front and rear outer corners of the spreader relative to the travel direction of the gantry lift stacker in order to determine the distance and orientation in the longitudinal direction of the set-down container.

This alternative arrangement of the outer sensors on the spreader likewise renders possible detection of the side walls of an already set-down container or its orientation relative to its longitudinal axis and the extent and positions of its rear wall.

Two exemplified embodiments of the invention will be explained in greater detail hereinafter with reference to drawings.

DESCRIPTION OF THE PREFERRED EMBODIMENTS

Figure 1:
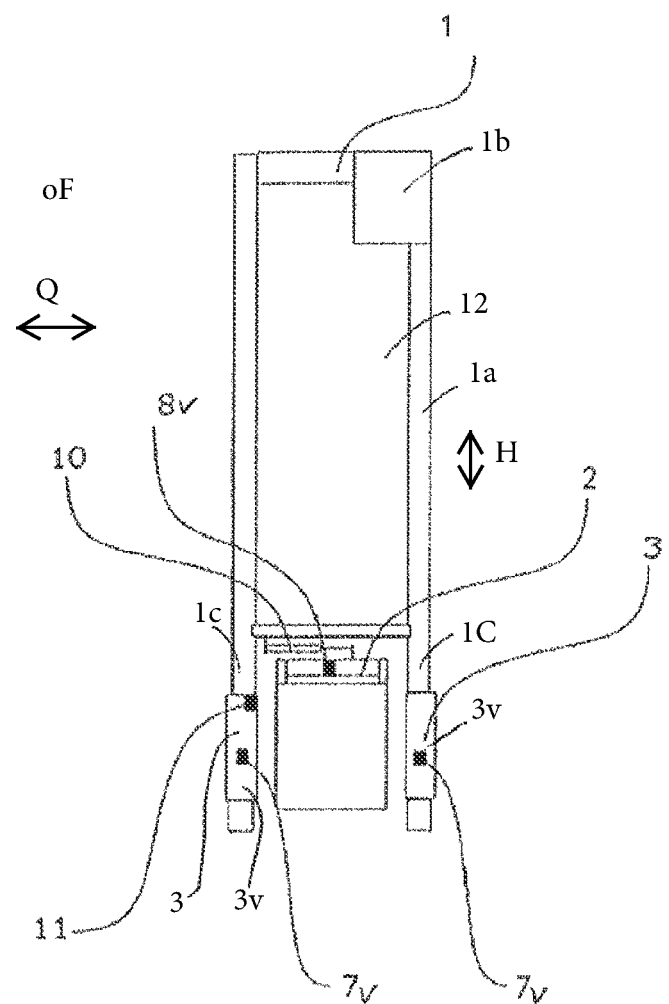
FIG. 1 shows a front view of the gantry lift stacker having an automatic positioning system.

FIG. 1 illustrates a front view of a gantry lift stacker, also known as a straddle carrier, designated by 1. The gantry lift stacker 1 essentially comprises a downwardly-open U-shaped gantry frame 1a, a load picking-up means in the form of a so-called spreader 2 and two travel supports 3. The gantry frame 1a with the travel support 3 encloses a space 12 which is open on three sides and is therefore open at the front, rear and bottom and can receive inside it, at least partially, one container 6 or two containers 5 and 6 one behind another as seen in a forwards travel direction F of the gantry lift stacker 1. The spreader 2 can travel vertically along vertical gantry supports 1c of the gantry frame 1a in a raising/lowering direction H. The two travel supports 3 adjoin the lower end of the gantry supports 1c. For orientation of the spreader 2 or of the container 5, 6 in a horizontal transverse direction Q extending transversely to the forwards travel direction F and for a rotation of the container 5, 6 about a vertical axis, the spreader 2 includes a lateral thrust unit 10. In order to determine a position of an upper edge or of a rear wall C2, D2 of a container 5, 6 with respect to the spreader 2, a front spreader sensor 8v is located at the front region of the spreader 2, and a rear spreader sensor 8h is located, for rearwards travel, at the rear region, said spreader sensors being orientated in the forwards travel direction F and opposite to the forwards travel direction F respectively and in particular vertically downwards, to the ground at a 90° angle.

Figure 3:
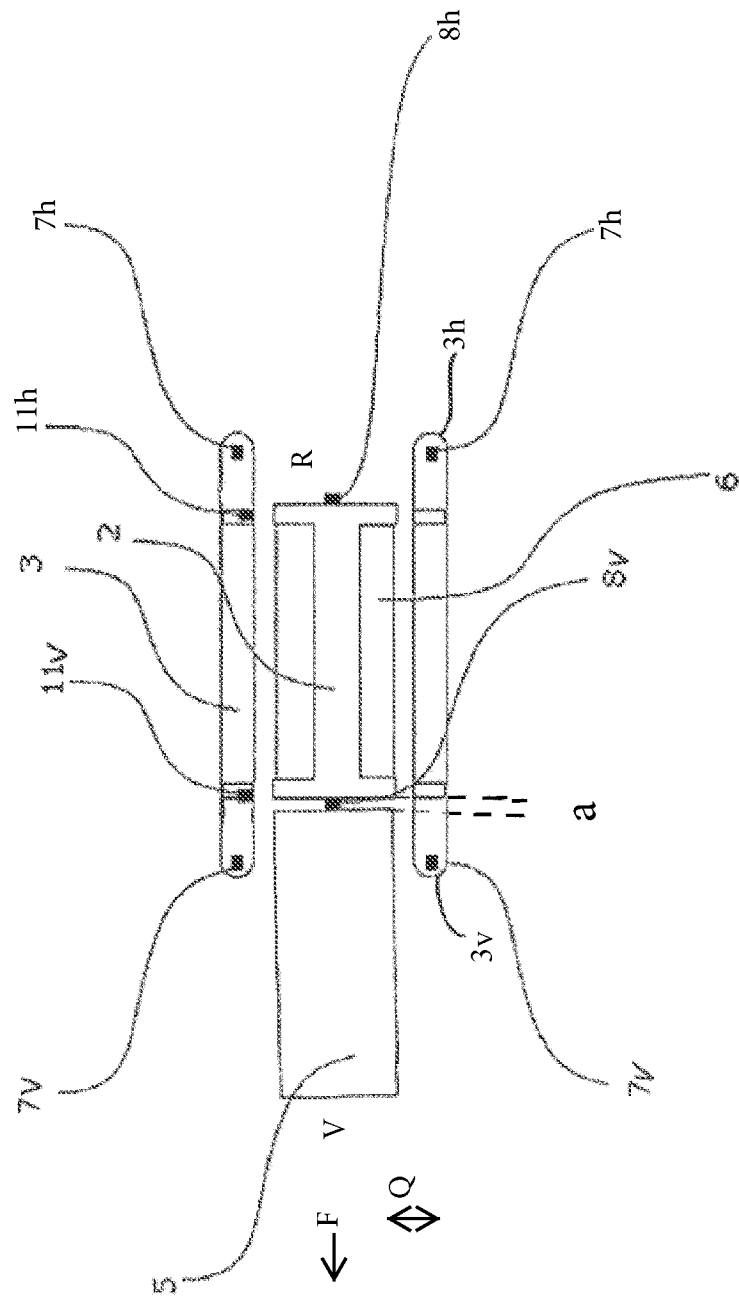
FIG. 3 shows a plan view of the gantry lift stacker of FIG. 1.

As an alternative to the spreader sensors 8v, 8h, at least one front inner sensor 11v is located at a front end 3v and at least one rear inner sensor 11h is located at a rear end 3h of the travel support 3 (see also FIG. 3). The inner sensors 11v, 11h are disposed on an inner side 3i of the travel support 3, which faces the space 12, and are orientated with their measurement direction inwards towards the space 12, i.e. pointing in the direction of a container 5, 6 which is set down or is to be set down. In order to determine the position of the gantry lift stacker 1 relative to a container 5 to be travelled over, a respective front outer sensor 7—pointing in the forwards travel direction F—is also located at the front end 3v of the travel supports 3.

Figure 2:
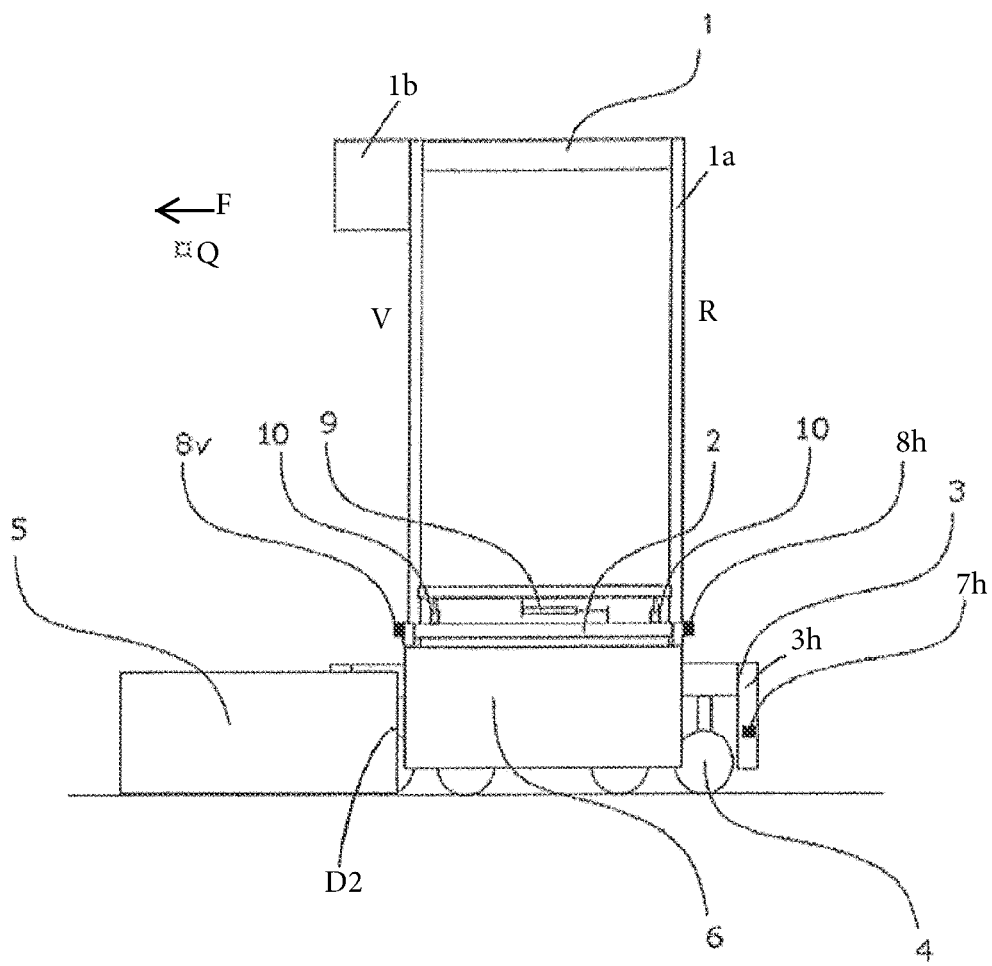
FIG. 2 shows a side view of the gantry lift stacker of FIG. 1.

FIG. 2 shows a side view of the gantry lift stacker 1 of FIG. 1, which, in addition to the lateral thrust unit 10, comprises a longitudinal thrust unit 9 for the spreader 2, which serves to orientate the container 6 in the longitudinal direction thereof relative to the spreader 2. At a rear face R of the gantry lift stacker 1, as seen relative to the forwards travel direction F, the rear spreader sensors 8h and the rear outer sensors 7h are disposed on the spreader 2 or at the rear end 3h of the travel supports 3 respectively. These are equivalent to the sensors 7v, 8v of the front face V of the gantry lift stacker 1 and assume the functions thereof in the event of a change in the travel direction F or the set-down direction for a container 5, 6. The travel supports 3, on which travel drives 4 with rubber-tyred wheels are disposed, are located respectively at the lower ends of the gantry frame 1a and travel to the left and right of the containers 5, 6 which are set down or are to be set down. A driver's cabin 1b is disposed in the upper region of the gantry frame 1a and at the front face V, from which cabin a driver looks out in the direction of the forwards travel direction F and operates the gantry lift stacker 1. The front spreader sensor 8v is orientated to the ground vertically downwards, i.e. at a 90° angle. This serves for detection of an upper edge or rear wall D2 and therefore for determination of the position of the rear wall D2 of the set-down container 5. For a set-down container 5 which is located behind the gantry lift stacker 1 (not shown) in the travel direction F, a vertically downwardly orientated rear spreader sensor 8h renders possible, as it were, the detection of an upper edge or rear wall D2 and therefore the determination of the position of the rear wall D2.

FIG. 3 shows a plan view of the gantry lift stacker 1 and illustrates that the gantry frame 1a can travel over a container 6 which is correspondingly disposed underneath the spreader 2 thereafter. The spreader 2 is H-shaped and can pick up and raise the container 6 by means of twist locks, not illustrated, at its four corner points 2a to 2d. A middle horizontal longitudinal axis of the spreader 2 is likewise orientated in the direction of the forwards travel direction F, i.e. the container 6 to be set down is disposed in the longitudinal direction below the gantry frame 1a. Alternatively, the spreader 2 can be a so-called twin-lift spreader which can extend along its horizontal longitudinal axis and can pick up two containers set down one behind the other.

Figure 4:
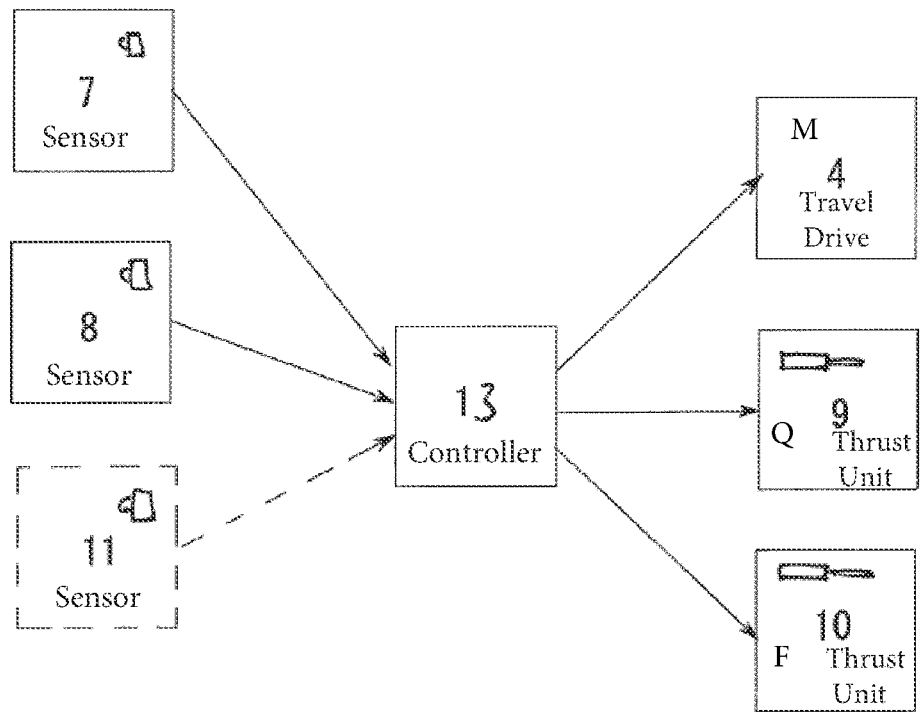
FIG. 4 shows a block circuit diagram of a controller of the gantry lift stacker.

The diagram illustrated in FIG. 4 depicts the mode of operation of automatic positioning of the container 6 or of the gantry lift stacker 1. Measurement data of the distance sensors 7h, 7v, of the spreader sensors 8h, 8v and of the inner sensors 11h, 11v are passed to a controller 13 of the gantry lift stacker 1. This calculates control values for the travel drives 4 and the longitudinal and lateral thrust units 9 and 10 which are then controlled according to the control values.

The invention is explained hereinunder on the basis of manual control of the travel drives 4 of the gantry lift stacker 1. At this juncture, the gantry lift stacker 1 is moved by the driver over a container 6 to be picked up. The container 6 is picked up and raised by the spreader 2. The driver then drives the gantry lift stacker 1 into a desired position, typically at a container transfer location behind an already set-down container 5 and lowers the spreader 2 in order to set the container 6 down. Thus the gantry lift stacker 1 is manually steered to the desired position by the driver.

In order to relieve pressure on the driver, the driver can use an automatic positioning system of the gantry lift stacker 1 for containers 6 to be set down. For the automatic positioning of the container 6 the outer sensors 7*h*, 7*v*, the spreader sensors 8*h*, 8*v* and alternatively the inner sensors 11*h*, 11*v* are used as follows. By means of the outer sensor 7*v* on the travel support 3, an already set-down container 5 is measured, during the approach, with respect to the orientation in the forwards travel direction F relative to a container 6 to be set down, i.e. any lateral deviation of the container 5 with respect to the container 6 is measured and the measurement values are forwarded to a controller 13 which calculates control values for the lateral thrust unit 10 and so the container 6 to be set down is flush, in relation to the longitudinal orientation thereof, with the set-down container 5 or the longitudinal direction thereof. The position of a rear edge or rear wall C2, D2 of a set-down container 5 is detected by means of the spreader sensor 8*h*, 8*v* or alternatively by means of the inner sensor 11*h*, 11*v*. The container 6 to be set down is orientated by the lateral thrust unit 10 laterally in the transverse direction Q and in the rotational direction D about a vertical axis according to the calculated control values. A desired distance a between the set-down container 5 and the container 6 to be set down is adjusted by the travel drive 4 or the longitudinal thrust unit 9 before the container 6 is set down.

By precise positioning of the set-down container 5 with respect to the container 6 to be set down, with a defined distance a, the gantry lift stacker 1 can be operated in so-called twin-lift operation. At this juncture, the spreader 2 is a so-called twin-lift spreader. This means that the spreader 2 can pick up two containers disposed one behind the other. For this purpose, the spreader 2 can be extended along its horizontal longitudinal axis. The distance from the corner points 2*a* and 2*b* to the corner points 2*c* and 2*d* of the H-shaped spreader 2 is doubled in twin-lift operation compared with single-lift operation in which the spreader 2 is not extended.

The sensors 7*h*, 7*v*, 8*h*, 8*v* and 11*h*, 11*v* are laser sensors in a preferred exemplified embodiment. Naturally, however, other sensor types are also feasible such as e.g. infrared sensors or microwave sensors. All sensors 7*h*, 7*v*, 8*h*, 8*v* and 11*h*, 11*v* can naturally also be sensor units, i.e. be formed by a plurality of sensors. The laser sensors can be point sensors or area sensors.

In the exemplified embodiment, although a gantry lift stacker 1 guided by an operator and having a driver's cabin 1*b* is described, the above-described invention is also suitable for use with automatically guided gantry lift stackers 1 or semi-automatic gantry lift stackers 1 with automatic steering, which is used only in the area where containers 5, 6 are picked up and put down.

The embodiment described above is also suitable for upgrading an existing gantry lift stacker 1, which already has outer sensors 7*h*, 7*v* on the travel supports 3 for automatic steering of the gantry lift stacker 1, to form a gantry lift stacker 1 with automatic steering and automatic orientation of a container 6 to be set down on an already set-down container 5.

Figure 5:
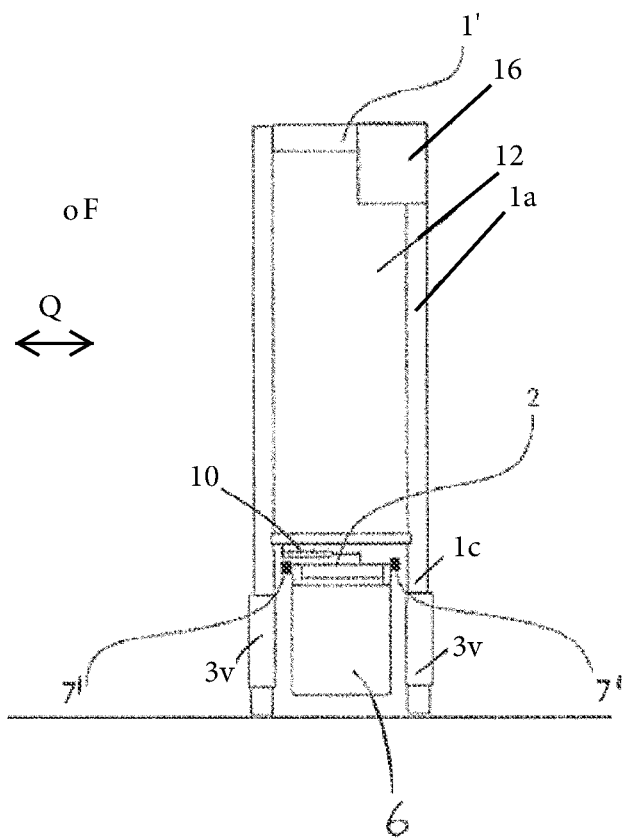
FIG. 5 shows a front view of a second embodiment of the gantry lift stacker.
Figure 6:
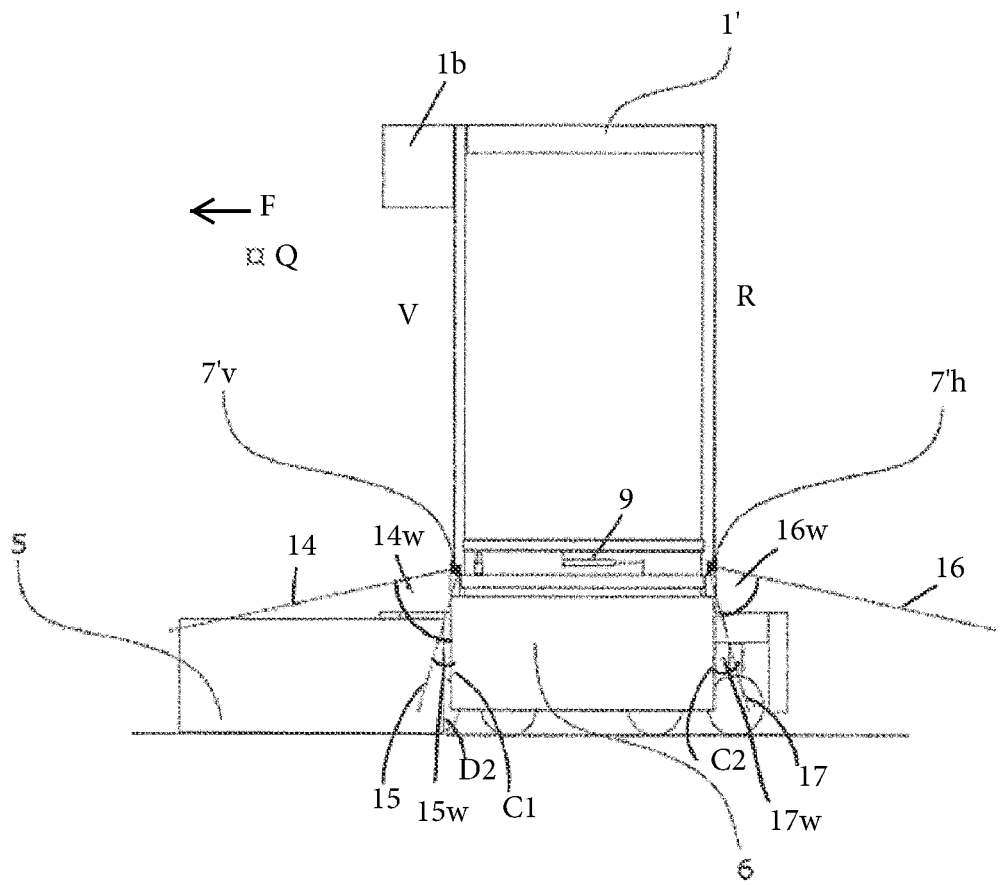
FIG. 6 shows a side view of the gantry lift stacker of FIG. 5.
Figure 7:
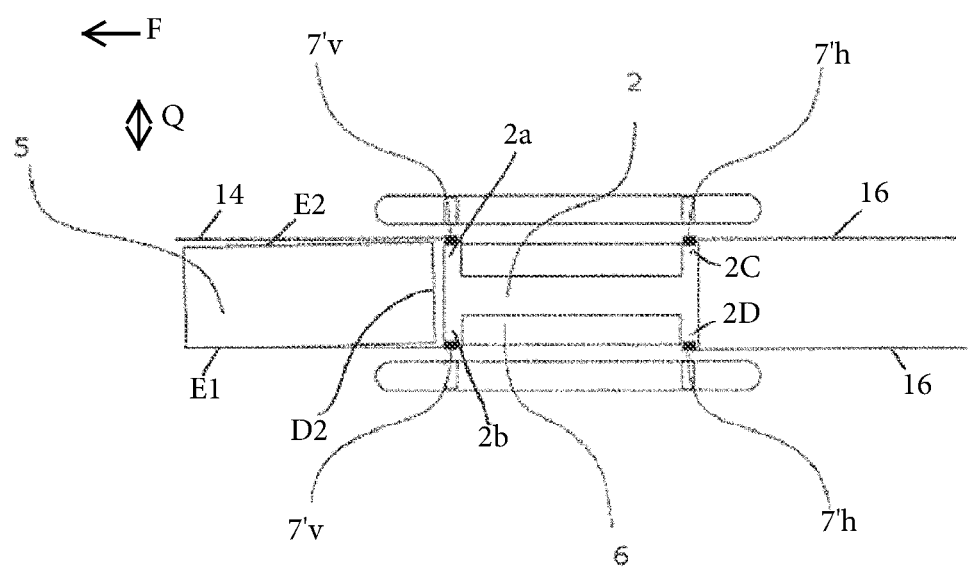
FIG. 7 shows a plan view of the gantry lift stacker of FIG. 5.

A second embodiment of the gantry lift stacker is illustrated in FIGS. 5, 6 and 7. The gantry lift stacker 1' matches the gantry lift stacker 1 in all components except for the spreader sensors 8*h*, 8*v* and inner sensors 11*h*, 11*v* being replaced. Thus, in relation to the existing commonalities of the two embodiments reference is made to the description relating to FIGS. 1 to 4.

FIG. 5 shows a front view of the gantry lift stacker 1'. An automatic positioning system includes only the outer sensors 7'*h*, 7'*v* which, as seen relative to the forwards travel direction F, are disposed respectively at the right and left corner points 2*a*, 2*b*, 2*c* and 2*d* of the H-shaped spreader 2 on the front face V and rear face R (see also FIG. 7). As seen in the forwards travel direction F, the outer sensor 7'*h*, 7'*v* are disposed laterally next to a picked-up container 6 and above an intermediate space between the travel support 3 and container 6.

In the embodiment illustrated in FIG. 6, the outer sensors 7'*h*, 7'*v* are formed as point sensors and comprise a pair, not illustrated, of sensor elements which are orientated in the forwards travel direction F in the corner points 2*a* and 2*b* and opposite to the forwards travel direction F in the corner points 2*c* and 2*d*. The sensor elements 7'*h*, 7'*v* thus scan each corner point 2*a* to 2*d* in two sensor directions 14, 16 and 15, 17. Sensor direction 14 is orientated in the forwards travel direction F and slightly downwards and thus forms an angle 14*w* of about 10 degrees with a notional horizontal through the outer sensor 7'*v*. This angle 14*w* is selected such that the outer sensor 7'*v* can detect an orientation of the container 5 which has been set down and is therefore upstream of the gantry lift stacker 1. Sensor direction 15 is orientated in the forwards travel direction F and steeply downwards and thus forms an angle 15*w* of about 80 degrees with a notional horizontal through the outer sensor 7'*v*. For the sensor directions 16, 17 the above description relating to sensor directions 14, 15 applies, wherein the sampling direction is orientated opposite to the forwards travel direction F. The sensors 7'*h*, 7'*v*, which are orientated in the sensor direction 15 and 17, therefore detect a rear wall D2 of the next set-down container 5 or another rearwards obstacle (not depicted).

FIG. 7 shows that the outer sensors 7'*h*, 7'*v*, which are orientated in the sensor direction 14 and 16, detect side walls E1 and E2 of the next container 5 or a lateral extent of another rearwards obstacle (not depicted). By determination of the position or orientation of the rear wall D2 and of the side walls E1 and E2 of the next set-down container 5 and forwarding measured values to the controller 13 of the gantry lift stacker 1', which calculates control values for the travel drives 4, the longitudinal thrust unit 9 and the lateral thrust unit 10, the container 6 on the next set-down container 5 is automatically orientated and can be placed at a predetermined distance a, which amounts to 10 to 100 mm, in particular 30 mm, behind the set-down container 6.

The previously described embodiment of a gantry lift stacker 1' with an automatic positioning system is suitable in particular for upgrading a manual gantry lift stacker without automatic steering or positioning.

The invention claimed is:

1. A method for the positioning of a gantry lift stacker configured as a straddle carrier for containers in order to longitudinally position a container to be set down behind an already set-down container, wherein the gantry lift stacker includes a gantry frame having spaced apart vertical gantry supports with travel supports adjoining lower ends of the gantry supports, and wherein the gantry lift stacker further includes a spreader that travels vertically along the gantry supports to raise and lower containers and includes travel drives and a controller for movement of the gantry lift stacker, said method comprising:

generating measurement signals from sensors disposed on the gantry lift stacker;

determining a position of a rear wall of the already set-down container via measurement signals from at least one of the sensors;

processing the measurement signals with the controller to move and position the gantry lift stacker and the container to be set down, where the container to be set down is held by the spreader; and setting down the container to be set down from the gantry lift stacker with the spreader at a preselected distance behind the set-down container such that the longitudinal orientation of the container to be set down is flush with the longitudinal direction of the set-down container.

2. The method as claimed in claim 1, wherein the controller comprises an automatically acting controller configured for automatic operation, wherein the container to be set down is set down automatically via the automatically acting controller.

3. The method as claimed in claim 2, wherein the automatically acting controller is configured to be selectively activated and deactivated for automatic operation by a driver.

4. The method as claimed in claim 1, wherein the gantry lift stacker is configured for manual operation by a driver, and wherein the container to be set down is set down in manual operation with assistance from the measurement values supplied by the sensors.

5. The method as claimed in claim 1, wherein the gantry lift stacker includes a spreader that can be raised and lowered whereby the gantry lift stacker picks up and sets down the container to be set down.

6. A gantry lift stacker for containers configured as a straddle carrier, said gantry lift stacker comprising:

a gantry frame having spaced apart vertical gantry supports with travel supports adjoining lower ends of the gantry supports;

travel drives and a controller cooperating therewith;

a spreader that travels vertically along the gantry supports and can be raised and lowered to handle containers;

at least one sensor disposed on the gantry lift stacker, said at least one sensor configured to enable determination of a position of a rear wall of an already set-down container such that a container to be set down with the spreader can be set down from the gantry lift stacker at a preselected distance behind the set-down container such that the longitudinal orientation of the container to be set down is flush with the longitudinal direction of the already set-down container.

7. The gantry lift stacker as claimed in claim 6, wherein the at least one sensor comprises at least two spreader sensors and at least four outer sensors, and wherein the at least two spreader sensors are disposed on a front face and a rear face of the spreader relative to the forward travel direction of the gantry lift stacker, and wherein the at least four outer sensors are disposed on four travel supports of the gantry lift stacker in order to determine a distance and an orientation in the longitudinal direction of the set-down container.

8. The gantry lift stacker as claimed in claim 7, wherein the at least two spreader sensors are orientated vertically downwards to the ground and are configured to detect an upper edge or rear wall of the set-down container.

9. The gantry lift stacker as claimed in claim 6, wherein the at least one sensor comprises at least four inner sensors and at least four outer sensors that are disposed on the travel supports, and wherein the travel supports comprise front travel supports and rear travel supports, wherein outer sensors disposed on the front travel supports are orientated forwards and outer sensors disposed on the rear travel supports are orientated rearwards relative to the forward travel direction, and wherein the at least four inner sensors are disposed inwardly on the travel supports of the gantry lift stacker in order to determine the distance and orientation in the longitudinal direction of the container to be set down.

10. The gantry lift stacker as claimed in claim 6, wherein the at least one sensor comprises at least four outer sensors, and wherein the at least four outer sensors are disposed at front and rear outer corners of the spreader relative to the travel direction of the gantry lift stacker in order to determine the distance and orientation in the longitudinal direction of the set-down container.

* * * * *